UNITED STATES PATENT OFFICE.

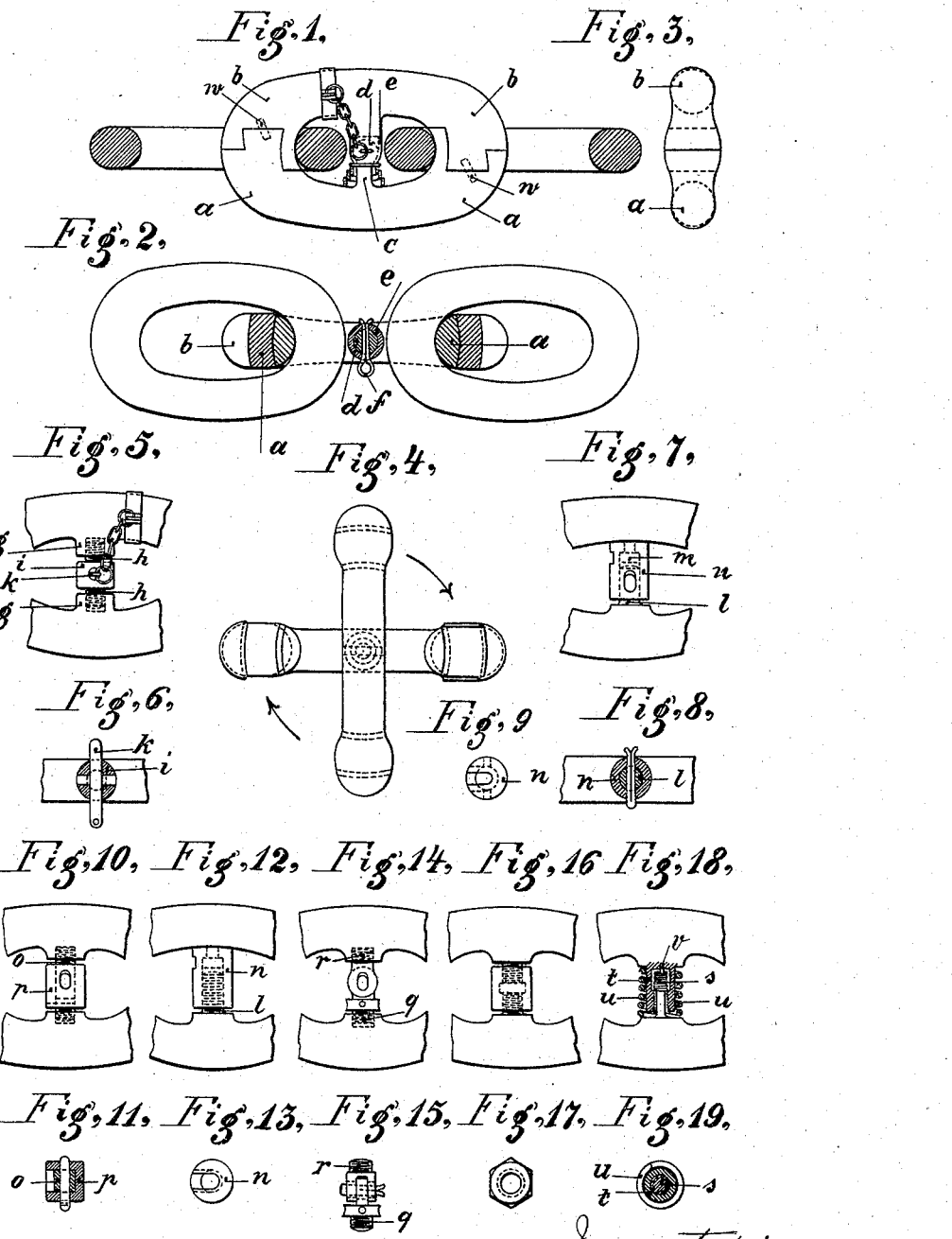

OTTO KLATTE, OF DUSSELDORF, GERMANY.

COUPLING SHACKLE OR LINK.

SPECIFICATION forming part of Letters Patent No. 612,501, dated October 18, 1898.

Application filed February 9, 1897. Serial No. 622,614. (No model.)

*To all whom it may concern:*

Be it known that I, OTTO KLATTE, a subject of the King of Prussia, Emperor of Germany, residing at Dusseldorf, Germany, have invented certain new and useful Improvements in Coupling Shackles or Links, of which the following is a specification.

This invention relates to a coupling shackle or link for joining two lengths of chain, and is more especially intended for use with mooring cables. This connecting-link possesses the following characteristics: It is so cut or divided at both ends in a longitudinal direction as to form separable dovetail joints, and is provided with an adjustable transverse stay by means of which the link can be distended and then loosened in the direction of its width in order to either wedge the dovetail joints firmly together or to slacken them, as may be desired. The accompanying drawings show links of this kind.

Figures 1 to 4 show a connecting-link divided at both ends; Figs. 5 to 19, various modifications of the transverse stays.

Fig. 1 is a plan of the first style of link; Fig. 2, a longitudinal central section; Fig. 3, an end elevation of the same. The connecting-link illustrated in these figures is formed in two halves $a$ and $b$, the parts of which that come into contact engaging one another in a kind of dovetail joint, so that the two halves when united cannot be separated either in the direction of the length of the link or of its breadth. They can, however, be separated in a plane perpendicular to the plane of the link. The dovetailing is preferably so formed that one half of the link can be turned upon the other around a central axis in the plane of the link, as shown in Fig. 4 of the drawings. The pivot required for this purpose is formed in the following manner: The half-link $a$ has an inwardly-projecting central stud $c$, Fig. 1, which terminates in a head $d$ of spherical form. The other half-link $b$ has opposite to the head $d$ a larger stud $e$, the end adjacent to the said head being bored or hollowed out.

When the halves of the link are in the relative position shown in Fig. 4, the head $d$, after, first, a spiral spring and then a washer has been passed upon its shank, is inserted in the recess in the hollow stud $e$, after which the edge of this hollow stud, which has been suitably split, is bent inward, so that the head $d$ cannot leave the recess in the stud $e$. The end links of the lengths of chain to be connected are then placed within that half of the opened link which is shown in a horizontal position in Fig. 4, whereupon the vertical half is turned in the direction indicated by the arrows until the ends of the two halves fit closely one within another, as shown in Fig. 1. The spiral spring above referred to distends the two halves in the direction of the breadth of the link, and thereby causes the dovetailed ends to be firmly wedged together or against each other. Finally, a pin $f$ is driven through corresponding holes pierced in the hollow stud $e$ and the head $d$ in order to prevent all possibility of the halves turning back. The pin may advantageously be attached to a small chain connected with one of the halves of the link. The said pin may be wedge-shaped, or a cotter may be used instead, so as to admit of the closed link being still farther forced apart or stretched in the direction of its width should the force exerted by the spiral spring not be sufficient for the purpose.

The above-described transverse stay may be modified in various ways.

In Figs. 5 and 6 each half of the link has an inwardly-projecting short central portion $g$, one of such portions having a right-handed and the other a left-handed internal thread. Into these internally-screw-threaded portions the oppositely-screw-threaded parts $h$ of a bolt $i$ are screwed. According as the bolt $i$ is turned in one or the other direction the closed link in the direction of its width is either forced apart or loosened. When the half-links have been loosened, they may be made to occupy the position shown in Fig. 4, and after the end links of the lengths of chain to be connected have been inserted they may be again caused to occupy the position shown in Fig. 1, whereupon the screw-bolt $h$ $i$ is screwed on by means of a pin or peg $k$, which is inserted in a hole provided in the head $i$. This pin $k$ may be attached to one of the halves of the link by means of a small chain.

In the form represented in Figs. 7 and 8 of the drawings one half-link is provided with an inwardly-projecting stud $l$, having a keyway, the other half of the link having a knob $m$. A suitably-recessed socket $n$ is passed upon this knob from the side, (see Fig. 9,) in which socket the stud $l$ is inserted. After the halves of the link have been turned into their closed position a pin is driven through corresponding holes in the socket or sleeve $n$ and the keyway of the stud $l$, which tightens up the closed link in such a manner as to prevent the two halves from being displaced against one another. If it is desired to separate the lengths of chain, this can be done after the cotter or pin has been forced out and the halves of the link again turned round.

In the form of transverse stay shown in Figs. 10 and 11 a pin $o$, provided with a keyway, is screwed into one half of the link, and over the square portion of such pin a socket or sleeve $p$, open at one side, is passed, which has a stud having screw-thread, but contrary to the thread of the pin $o$, and engaging an internally-screw-threaded recess in the other half of the link, the socket or sleeve $p$ and the pin $o$ being connected by a cotter.

The form of transverse stay shown in Figs. 12 and 13 only differs from the form shown in Figs. 7, 8, and 9 in that the stud $l$ is externally and the socket or sleeve $n$ internally screw-threaded. The key is in this case not required.

In the form shown in Figs. 14 and 15 the transverse stay comprises two screw-threaded pins $q$ and $r$, whose heads are hinged one within the other, the joint being maintained by means of a key. The two pins are oppositely screw-threaded and screw into corresponding internally-screw-threaded recesses in the two halves of the link. By driving the taper-key in or out the connection can be either tightened or slackened, as desired. The head of the pin $q$ is provided with holes, which may likewise be used to effect the tightening or slackening of the connection. In this case, as well as those shown in Figs. 5 and 10, the key or pin may be so arranged as to lie in the plane of the link, which renders it quite impossible for it to drop out.

In the form of transverse stay shown in Figs. 16 and 17 one half of the link has firmly fixed in it a right-handed and the other a left-handed screw. These two screws are screwed into a nut common to both, one end of which has a right-handed and the other a left-handed internal thread. By turning the nut in one or the other direction the link may be either tightened or slackened.

In the form of transverse stay illustrated in Figs. 18 and 19 one half of the link is provided with a stud $s$, only the outer half of its length being screw-threaded. The other half of the link has a hollow stud $t$, which is provided with a corresponding internal thread, such thread being formed only upon half the depth of the bored or hollowed portion of the stud. The lower portion of this boring is turned to larger diameter. Before screwing the stud $s$ into the hollow stud $t$ a spiral spring $u$ is passed over the latter. The stud $s$ is then screwed in far enough to free it from the internal thread, whereupon the two halves of the link may be freely turned one upon the other, as desired. The tightening up of the closed link is effected by means of the spiral spring $u$ and by driving in a cotter or key $v$. If it is desired to loosen and to separate the two halves of the link, the key is removed, the spiral spring compressed, and the studs $s$ and $t$ unscrewed.

The halves of the connecting-link described with reference to Figs. 1 to 19 of the drawings may be yet more securely connected if upon the parts where dovetail joint is made (see Fig. 1) opposite grooves $w$ are provided and arranged in an inclined direction to the dovetail joint and into such grooves flat keys driven. This method may advantageously be adopted when the link once closed will not have to be reopened.

Having now particularly described and ascertained the nature of my said invention and in what manner the same is to be performed, I declare that what I claim is—

1. The combination with a sectional link having its ends dovetailed, of a sectional transverse stay, and means for increasing or decreasing the length of said stay after its sections have been coupled together, substantially as set forth.

2. The combination with a sectional link having its ends dovetailed, of a sectional transverse stay, and elastic means for adjusting the length of said stay after its sections have been coupled together, substantially as set forth.

3. The combination with a sectional link having its ends dovetailed, of a sectional transverse stay, means for increasing or decreasing the length of said stay after its sections have been coupled together, and locking means for confining said sections in their proper relative positions, substantially as set forth.

4. The combination with a sectional link having its ends dovetailed, of a sectional transverse stay, means for adjusting the length of said stay after its sections have been coupled together, a key inserted between the sections of such stay, and a chain connecting the key with the link, substantially as set forth.

In testimony whereof I have signed my name to this specification in the presence of two subscribing witnesses.

OTTO KLATTE.

Witnesses:
WILLIAM ESSENWEIN,
LAURA LIEBER.